United States Patent
Griffing

(10) Patent No.: US 9,302,434 B2
(45) Date of Patent: Apr. 5, 2016

(54) THERMOPLASTIC COMPOSITE SUPPORT STRUCTURES WITH INTEGRAL FITTINGS AND METHOD

(71) Applicant: The Boeing Company, Chicago, IL (US)

(72) Inventor: James Scott Griffing, Mountlake Terrace, WA (US)

(73) Assignee: THE BOEING COMPANY, Chicago, IL (US)

( * ) Notice: Subject to any disclaimer, the term of this patent is extended or adjusted under 35 U.S.C. 154(b) by 115 days.

(21) Appl. No.: 14/095,531

(22) Filed: Dec. 3, 2013

(65) Prior Publication Data

US 2015/0151467 A1    Jun. 4, 2015

(51) Int. Cl.
| | |
|---|---|
| *B29C 45/02* | (2006.01) |
| *B29C 70/50* | (2006.01) |
| *B29C 45/04* | (2006.01) |
| *B29K 105/12* | (2006.01) |

(52) U.S. Cl.
CPC ............... *B29C 70/50* (2013.01); *B29C 45/02* (2013.01); *B29C 45/0408* (2013.01); *B29K 2105/12* (2013.01); *Y10T 428/24132* (2015.01); *Y10T 428/31504* (2015.04); *Y10T 428/31533* (2015.04); *Y10T 428/31721* (2015.04)

(58) Field of Classification Search
CPC .. B29C 45/021; B29C 45/02; B29C 45/0408; B29C 70/50
USPC .............................. 428/99; 264/279
See application file for complete search history.

(56) References Cited

U.S. PATENT DOCUMENTS

| | | | |
|---|---|---|---|
| 2,949,054 | A | 8/1960 | White |
| 2,954,586 | A | 10/1960 | Wacker |
| 3,646,610 | A | 2/1972 | Jackson |
| 4,029,841 | A | 6/1977 | Schmidt |
| 4,370,390 | A | 1/1983 | Burk |
| 4,433,652 | A | 2/1984 | Holtzberg et al. |
| 4,623,290 | A | 11/1986 | Kikuzawa et al. |
| 4,717,302 | A | 1/1988 | Adams et al. |
| 4,752,201 | A | 6/1988 | Kauffman |
| 4,824,314 | A | 4/1989 | Stencel |
| 4,925,719 | A | 5/1990 | Staneluis et al. |
| 4,969,971 | A | 11/1990 | Ehnert et al. |
| 4,983,451 | A | 1/1991 | Sugino et al. |
| 4,987,175 | A | 1/1991 | Bunnell, Sr. |
| 5,056,257 | A | 10/1991 | Cook |
| 5,057,257 | A | 10/1991 | Nietzke |
| 5,061,423 | A | 10/1991 | Layden |

(Continued)

FOREIGN PATENT DOCUMENTS

| | | | | |
|---|---|---|---|---|
| EP | 0344721 | A1 | 12/1989 | |
| EP | 0376472 | A2 * | 7/1990 | .......... B29C 45/0005 |

(Continued)

OTHER PUBLICATIONS

Office Action, dated Oct. 31, 2014, regarding U.S. Appl. No. 14/095,711, 20 pages.

(Continued)

*Primary Examiner* — Brent O'Hern
(74) *Attorney, Agent, or Firm* — Yee & Associates, P.C.

(57) ABSTRACT

A compression molded composite structure includes an elongated thermoplastic composite part having integral thermoplastic composite fittings.

12 Claims, 12 Drawing Sheets

(56) References Cited

U.S. PATENT DOCUMENTS

| | | | |
|---|---|---|---|
| 5,062,415 | A | 11/1991 | Weatherby et al. |
| 5,090,857 | A | 2/1992 | Dunn |
| 5,151,322 | A | 9/1992 | Kimoto et al. |
| 5,292,215 | A | 3/1994 | Roberts, III |
| 5,543,092 | A | 8/1996 | Ibar |
| 5,688,426 | A | 11/1997 | Kirkwood et al. |
| 5,935,698 | A | 8/1999 | Pannell |
| 6,106,752 | A | 8/2000 | Chang et al. |
| 6,460,310 | B1 | 10/2002 | Ford et al. |
| 6,521,152 | B1 | 2/2003 | Wood et al. |
| 6,924,021 | B1 | 8/2005 | Colegrove et al. |
| 7,198,739 | B2 | 4/2007 | La Forest et al. |
| 7,208,220 | B2 | 4/2007 | Yamasaki et al. |
| 7,462,879 | B2 | 12/2008 | Oohata et al. |
| 7,527,759 | B2 | 5/2009 | Lee et al. |
| 7,807,005 | B2 | 10/2010 | Rubin et al. |
| 7,871,553 | B2 | 1/2011 | Wilkerson et al. |
| 7,896,599 | B2 | 3/2011 | Stephen et al. |
| 8,101,262 | B2 | 1/2012 | Yamanouchi et al. |
| 8,329,280 | B2 | 12/2012 | Taketa et al. |
| 8,333,858 | B2 | 12/2012 | Rubin et al. |
| 8,419,997 | B2 | 4/2013 | Hackl |
| 8,465,241 | B2 | 6/2013 | Gaw et al. |
| 8,491,745 | B2 | 7/2013 | Wilkerson et al. |
| 2003/0057590 | A1 | 3/2003 | Loher et al. |
| 2006/0125156 | A1 | 6/2006 | Woolhouse |
| 2007/0149080 | A1 | 6/2007 | Asahara et al. |
| 2007/0175573 | A1 | 8/2007 | Fox et al. |
| 2008/0169380 | A1 | 7/2008 | Jackson et al. |
| 2011/0111172 | A1 | 5/2011 | Gideon et al. |
| 2011/0206906 | A1 | 8/2011 | Rubin et al. |
| 2011/0223273 | A1 | 9/2011 | Honma et al. |
| 2013/0022391 | A1 | 1/2013 | Fisher, Jr. et al. |
| 2013/0047403 | A1 | 2/2013 | Gideon et al. |
| 2013/0189478 | A1 | 7/2013 | Fisher, Jr. et al. |

FOREIGN PATENT DOCUMENTS

| | | |
|---|---|---|
| EP | 0419403 A1 | 3/1991 |
| EP | 0916477 A1 | 5/1999 |
| EP | 1745914 A2 | 1/2007 |
| EP | 1849588 A1 | 10/2007 |
| EP | 0376472 A2 | 7/2009 |
| GB | 2349600 A | 11/2000 |
| WO | 8909123 A1 | 10/1989 |
| WO | WO2006044315 A2 | 4/2006 |
| WO | 2008149615 A1 | 12/2008 |
| WO | 2009120920 A1 | 10/2009 |
| WO | 2011056293 A1 | 5/2011 |

OTHER PUBLICATIONS

Fisher, Jr., "Method and Apparatus for Compression Molding Fiber Reinforced Thermoplastic Parts," U.S. Appl. No. 14/095,711, filed Dec. 3, 2013, 40 pages.

Fisher, Jr. et al., "Hybrid Laminate and Molded Composite Structures," U.S. Appl. No. 14/095,693, filed Dec. 3, 2013, 30 pages.

Batra, "A Novel Process: Exjection," Popular Plastics & Packaging, Colouor Publication Ltd., Jun. 2010, pp. 51-53.

"Exjection: Injection Mounding in a New Dimension," IB Steiner, 1 page, accessed Nov. 25, 2013. http://www.exjection.com/en/index.html.

Knights, "Close-Up on Technology: New Low-Pressure Process Molds Long Profiles on Small Presses," Platics Technology, Jul. 2008, 3 pages, accessed Nov. 25, 2013. http://www.ptonline.com/articles/new-low-pressure-process-molds-long-profiles-on-small-presses.

International Search Report and Written Opinion, dated Feb. 10, 2011, regarding Application No. PCT/US2010/048017 (WO2011056293), 10 pages.

"Compression Molding," Wikipedia, dated May 26, 2012, 4 pages, accessed May 30, 2013. http://en.wikipedia.org/wiki/Compression_molding.

"Fabrication Methods," Composites World, dated Nov. 1, 2007, 9 pages, accessed May 30, 2012. http://www.compositesworld.com/articles/fabrication-methods.

"HexMC Moulding Concept: Carbon Epoxy HexMC/C/2000/M77—Product Data," Hexcel Corporation, Publication FTC112h, Oct. 2012, 2 pages.

"HexMC Moulding Concept: Carbon Epoxy HexMC/C/2000/R1A—Product Data," Hexcel Corporation, Publication FTC112f, Dec. 2008, 2 pages.

"HexTow Chopped Fiber: Carbon Fiber—Product Data," Hexcel Corporation, Sep. 2009, 2 pages.

Black "Redeisgning for Simplicity and Economy," High-Performance Composites, Jan. 2012, 4 pages, accessed Feb. 28, 2013. http://www.compositesworld.com/articles/redesigning-for-simplicity-and-economy.

Brosius, "Thermoplastic Composites Making an Impact," Composites World, dated Feb. 1, 2003, 6 pages, accessed May 30, 2012. http://www.compositesworld.com/articles/thermoplastic-composites-making-an-impact.

Pan et al., "Analysis of 3D Random Chopped Fiber Reinforced Composites Using FEM and Random Absorption," ScienceDirect, Computational Materials Science, vol. 43, Issue 3, Sep. 2008, pp. 450-461.

Bartel et al., "Method and Apparatus for Fabricating Composite Fasteners," U.S. Appl. No. 13/773,042, filed Feb. 21, 2013, 29 pages.

Blom, "Hybrid Fastener and Method of Making the Same," U.S. Appl. No. 13/773,120, filed Feb. 21, 2013, 25 pages.

Extended European Search Report, dated Apr. 16, 2015, regarding Application No. EP14191457.2, 7 pages.

Extended European Search Report, dated Apr. 16, 2015, regarding Application No. EP14196023.7, 8 pages.

Extended European Search Report, dated Apr. 21, 2015, regarding Application No. EP14196129.2, 8 pages.

Final Office Action, dated May 14, 2015, regarding U.S. Appl. No. 14/095,711, 9 pages.

Office Action, dated Sep. 8, 2015, regarding U.S. Appl. No. 14/095,711, 8 pages.

Notice of Allowance, dated Nov. 2, 2015, regarding U.S. Appl. No. 14/095,711, 7 pages.

\* cited by examiner

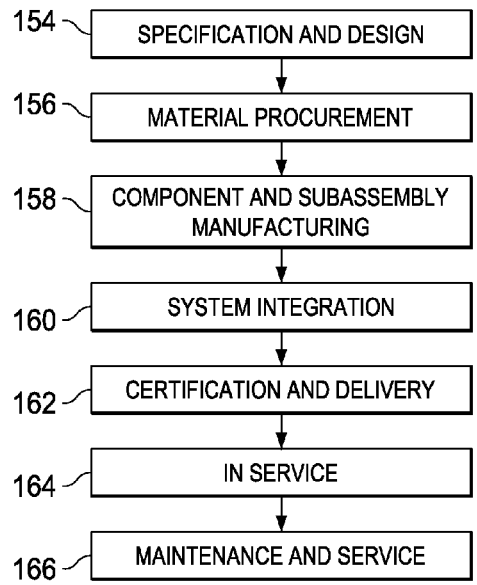
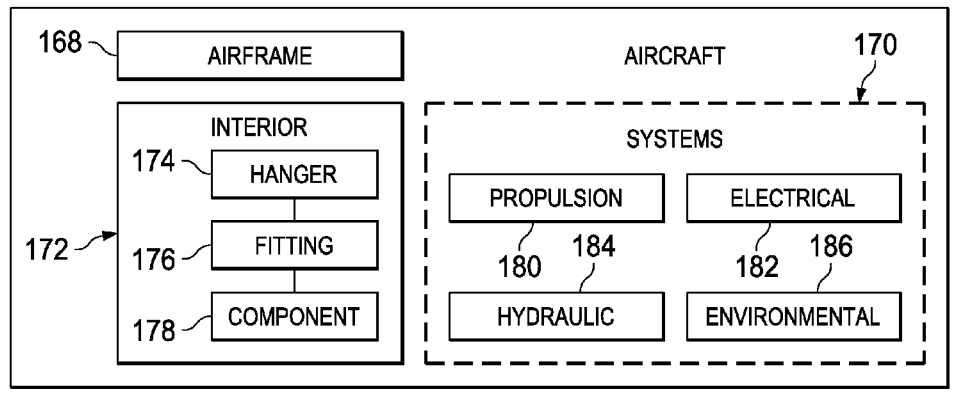

THERMOPLASTIC COMPOSITE SUPPORT STRUCTURES WITH INTEGRAL FITTINGS AND METHOD

CROSS REFERENCE TO RELATED APPLICATIONS

This application is related to co-pending U.S. patent application Ser. No. 14/095,711, filed concurrently herewith on Dec. 3, 2013, and co-pending U.S. patent application Ser. No. 14/095,693, filed concurrently herewith on Dec. 3, 2013, both of which applications are incorporated by reference herein in their entireties.

BACKGROUND INFORMATION

1. Field

The present disclosure generally relates to the fabrication of composite parts, and deals more particularly with a fiber reinforced thermoplastic support structure having integral fittings.

2. Background

Support structures sometimes have unique fittings to provide points for attaching, supporting or connecting the structure with other components. In the aircraft industry, certain support structures may be formed from a machined metal member, sometimes referred to as a "hog-out", that has sections that are uniquely formed for specific applications. Although effective, these specially configured machined members may be heavier than desired, and are expensive to fabricate.

One partial solution to the problem resorts to forming extrusion-like support structures from fiber reinforced thermoplastic using a continuous compression molding process in which metallic or separately molded fittings are assembled with the support structure. This approach, however, is labor intensive and also results in a support structure that is heavier than desired.

Accordingly, there is a need for a composite support structure having unique fittings that is both light weight and easy to manufacture. There is also a need for a method of making such composite support structures that is capable of integrating uniquely configured fittings, and which is well-suited to higher production rate environments.

SUMMARY

The disclosed embodiments provide a composite support structure having uniquely configured, integral fittings suitable for forming attachment points for supporting or attaching other components and/or transferring loads to other structures. By integrating the fittings into the support structure, fabrication costs are reduced and structural performance may be increased. Support structures may be produced in continuous lengths with fittings that are integrated at any desired location along its length.

According to one disclosed embodiment, a method is provided of making a composite part having at least one integral fitting. A compression cylinder is placed on a mold having a part cavity and at least one fitting cavity, and the compression cylinder and the mold are moved relative to each other. A charge of fiber reinforced resin flakes is placed in the cylinder, and the resin in the flakes is melted to form a flowable mixture of resin and fibers. The flowable mixture is compressed into the part cavity and into the fitting cavity as the compression cylinder and the mold move relative to each other. Moving the mold may be performed by moving the mold relative to the compression cylinder either intermittently or continuously. A plurality of the compression cylinders may be placed on the mold at different locations to form different regions of the part. The compression cylinders may be filled off-line. Compressing the flowable mixture is performed by forcing a piston through the cylinder. The resin may be a thermoplastic resin and the fibers may have a length greater than approximately 0.25 inches. The fibers may have a length of approximately 0.50 inches.

According to another disclosed embodiment, a method is provided of making an elongated, fiber reinforced thermoplastic structure having an integral fitting. The method includes forming a fiber reinforced thermoplastic part, and compression molding a thermoplastic fitting on the fiber reinforced thermoplastic part. Forming the fiber reinforced thermoplastic part may be performed by continuous compression molding. Compression molding of the thermoplastic fitting may comprise placing a compression cylinder on the part and using the compression cylinder to compress a flowable mixture of thermoplastic resin and randomly oriented reinforcing fibers onto the part. The compression cylinder may be moved to various regions along a length of the part to successively form each of a plurality of fittings on the part. The method may further comprise melting together areas of the part with the flowable resin. Compression molding of the thermoplastic fitting may include positioning a mold on the part, and using the compression cylinder to compress a flowable mixture of thermoplastic resin and fibers into the mold and against the part. The method may also comprise introducing a charge of thermoplastic prepreg flakes into the compression cylinder, and melting the resin in the prepreg flakes by heating the charge within the compression cylinder.

According to still another disclosed embodiment, a composite structure comprises an elongated part formed of a thermoplastic resin reinforced with fibers, and at least one fixture integral with the part and formed of a thermoplastic resin reinforced with randomly oriented fibers. The randomly oriented fibers may each have a length between approximately 0.25 inches and approximately 0.50 inches. The fibers reinforcing the part are substantially continuous and unidirectional. The fibers reinforcing the part respectively have substantially random fiber orientations. The resin of the part and the resin of the fixture are melted together.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 21 is an illustration of a flow diagram of aircraft production and service methodology.

FIG. 22 is an illustration of a block diagram of an aircraft.

DETAILED DESCRIPTION

Figure 1:
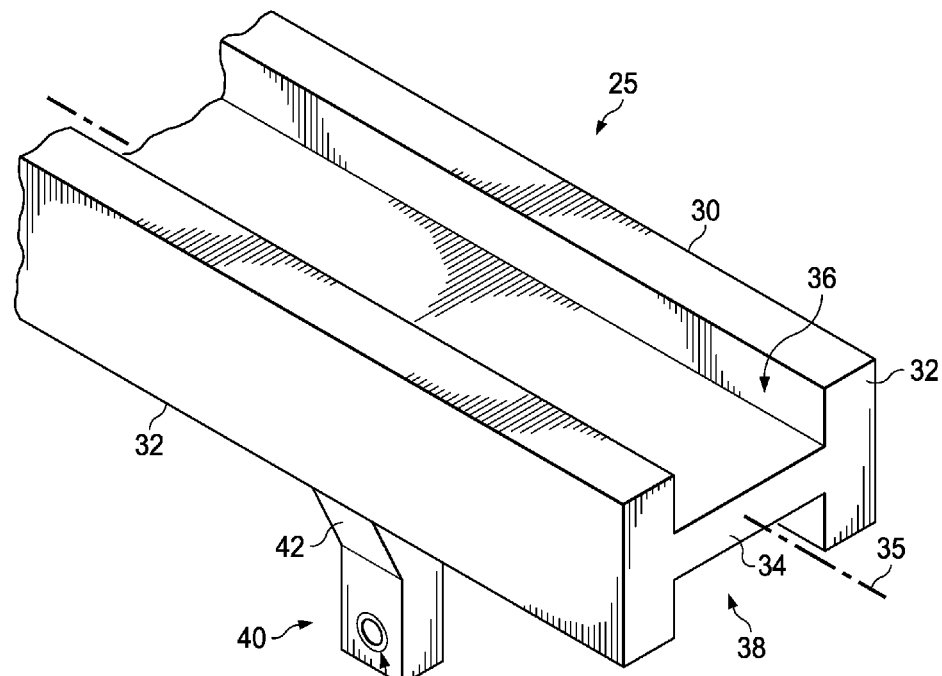
FIG. 1 is illustration of a perspective view of a thermoplastic composite support structure having an integral fitting according to the disclosed embodiments.
Figure 2:
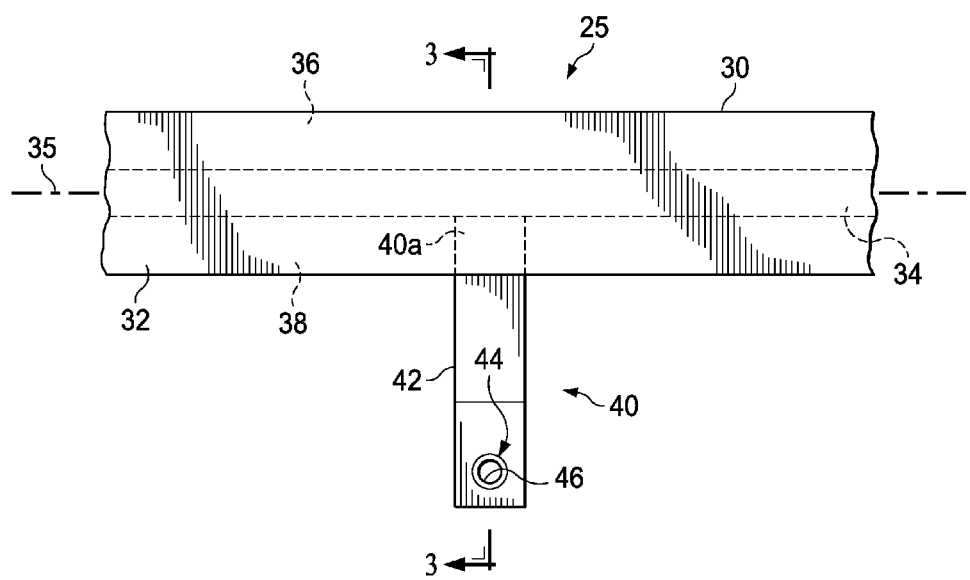
FIG. 2 is an illustration of a side elevational view of the support structure shown in FIG. 1.
Figure 3:
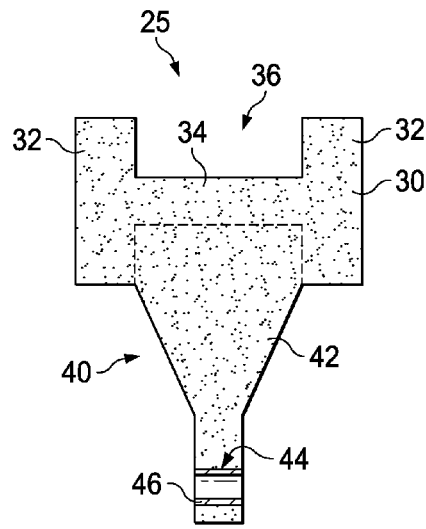
FIG. 3 is an illustration of a sectional view taken along the line 3-3 in FIG. 2.

Referring to FIGS. 1, 2 and 3, the disclosed embodiments relate to an elongated, fiber reinforced thermoplastic support structure 25 having a longitudinal axis 35. The support structure 25 broadly comprises a thermoplastic composite part having one or more integral thermoplastic composite fittings 40. In the exemplar, the part 30 has a substantially H-shaped cross-section defined by a pair of legs 32, sometimes also known as flanges 32. The legs 32 are joined together by a central web 34, however the part 30 may have any of a variety of other cross-sectional shapes. The legs 32 and the web 34 form upper and lower channels 36, 38 respectively. One or more of the fittings 40 are integrally formed with the part 30, such that the fitting 40 is attached to the web 34 as well as to both legs 32. The fittings 40 may have any of a variety of sizes and shapes, and are adapted to support other components (not shown) or to serve as attachment points that attach the part 30 to other structures. Depending on the application, the fittings 40 may transmit loads between the part 30 and other structures.

As best seen in FIGS. 2 and 3, the fittings 40 are integrally formed with the part 30 at one or more desired locations along the longitudinal axis 35 of the support structure 25. In the illustrated example, the fitting 40 fills a portion of the lower channel 38 and is integral with the legs 32 and web 34 of the part 30. In the exemplar, the fitting 40 has a tapered body 42 that may have one or more through holes 44 in the outer extremity thereof. Optionally, an insert 46 formed of a wear resistant material such as metal may be located in the through hole 44. Each of the fittings 40 may have any of a variety of unique shapes configured to meet the requirements of the particular application. As will be discussed below in more detail, in one embodiment, the part 30 and the fitting 40 are each formed of a thermoplastic resin reinforced with relatively long fibers that have orientations that are substantially random. In another, later discussed embodiment, however, the part 30 is reinforced with continuous unidirectional fibers while the fittings 40 are reinforced with discontinuous, randomly oriented long fibers.

Attention is now directed to FIGS. 4 and 7-10 which illustrate apparatus 55 for compression molding elongated thermoplastic composite support structures 25 having one or more integral fittings 40. The apparatus 55 includes a mold assembly 48, and a compression cylinder 50 that are movable (FIGS. 4 and 7) relative to each other. In the illustrated example, the mold assembly 48 is movable 66 (FIGS. 4 and 7) toward the right as the compression cylinder 50 remains stationary, however in other embodiments, the compression cylinder 50 may be movable while the mold assembly 48 remains stationary. It may also be possible to move both the mold assembly 48 and the compression cylinder 50 simultaneously. As will be discussed below, the compression cylinder 50 incrementally compression molds regions of the part 30 along with the fittings 40 as the compression cylinder 50 and the mold assembly 48 move 66 relative to each other, either continuously or intermittently.

The mold assembly 48 comprises an elongated lower mold 60 and an elongated upper mold 62 removably secured together by a suitable fasteners 70. Other means, such as a press or hydraulic clamps (not shown) may be employed to hold the molds 60, 62 together. The lower mold 60 includes an upper mold part cavity 64 extending along its length, and a series of individual, lower mold fitting cavities 65 extending along its length. The upper mold cavity 64 corresponds to the shape of the part 30, and the lower mold cavities 65 respectively correspond in shape to the fittings 40.

Figure 8:
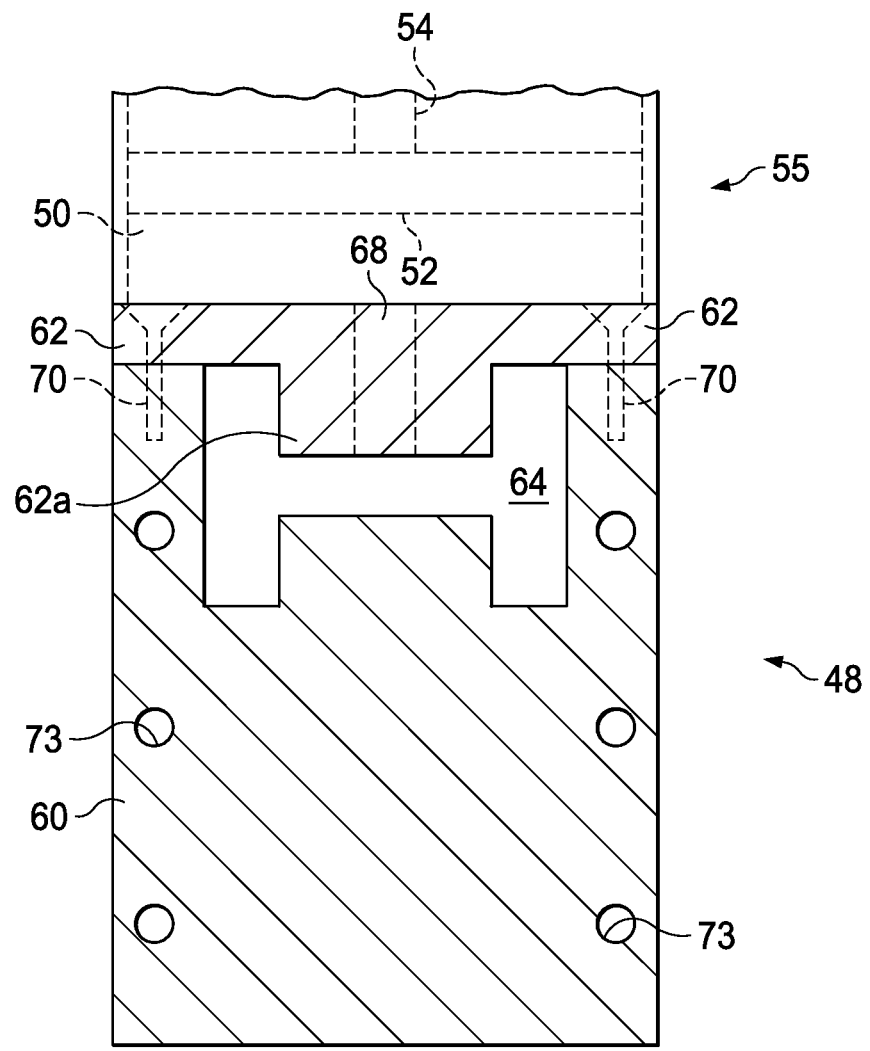
FIG. 8 is an illustration of a sectional view taken along the line 8-8 in FIG. 4.
Figure 9:
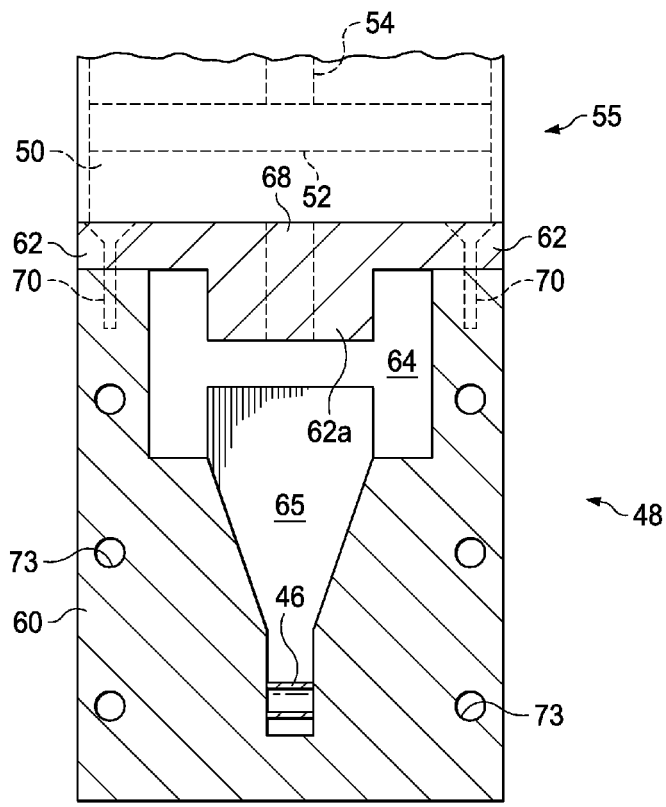
FIG. 9 is an illustration of a sectional view taken along the line 9-9 FIG. 4.
Figure 10:
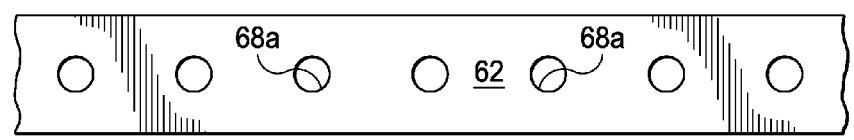
FIG. 10 is an illustration of a plan view in the direction designated as "FIG. 10" in FIG. 4, better showing inlet openings in the upper mold section.
Figure 11:
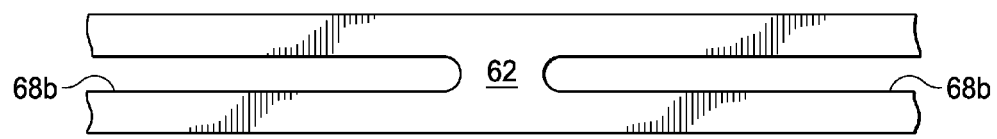
FIG. 11 is an illustration similar to FIG. 10 but showing an alternate arrangement of the inlet openings in the upper mold section.

Referring particularly to FIGS. 8 and 9, the lower mold 60 may include internal passageways 73 for carrying a fluid used to heat and/or cool the mold assembly 48. The lower mold cavities 65 communicate with and extend downwardly from the upper mold cavity 64. The upper mold 62 includes a mandrel 62a that extends into the upper mold cavity 64. The upper mold 62 also includes one or more inlet openings 68 that pass through the thickness of the upper mold 62 into the upper mold cavity 64. In the illustrated embodiment, the inlet openings 68 are centrally located and pass through the mandrel 62a, however the inlet openings 68 may be located in other areas of the mandrel 62. In one embodiment, as best seen in FIG. 10, the inlet openings 68 may comprise a series of longitudinally spaced, individual through-holes 68a, while in another embodiment shown in FIG. 11, the inlet openings 68 may comprise one or more elongated openings 68b.

Figure 5:
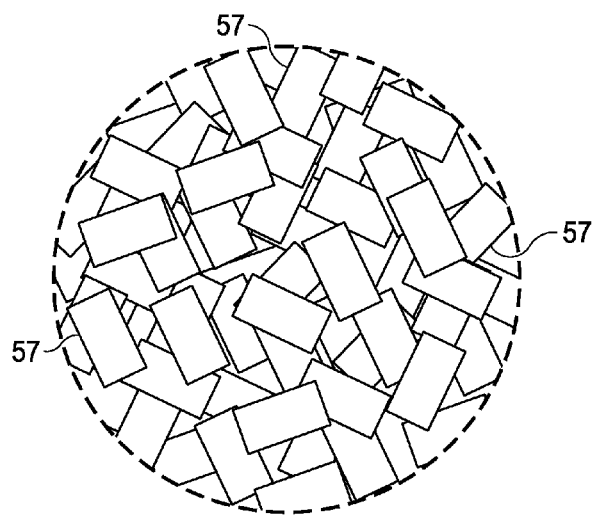
FIG. 5 is an illustration of fiber reinforced thermoplastic flakes of the charge before the resin in the flakes is melted.
Figure 6:
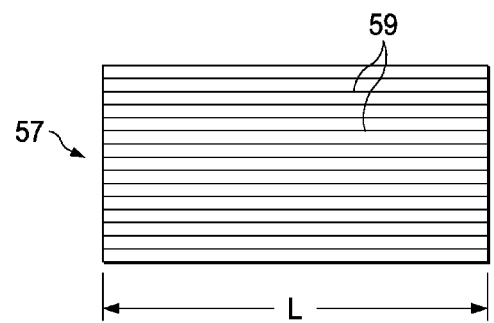
FIG. 6 is an illustration of a plan view of one of the flakes in the charge shown in FIG. 5.

Referring now to FIGS. 4, 7, 8 and 9, the compression cylinder 50 is seated on top of the upper mold 62, overlying the inlet openings 68. The compression cylinder 50 is adapted to receive a charge 56 of fiber reinforced resin flakes 57 (FIG. 5) therein. As shown in FIG. 6, the flakes 57 may comprise a suitable thermoplastic resin reinforced with unidirectional fibers 59. The thermoplastic resin may include thermoplastic matrix polymers as, without limitation, polyetheretherketone ("PEEK"), polyetherketoneketone ("PEKK"), polyphenylsulfone ("PPS"), polyetherimide ("PEI"). The fibers 59 (FIG. 6) may be formed from carbon, glass or other materials suitable for the application. The flakes 57 may be produced by, without limitation, chopping unidirectional thermoplastic prepreg into a desired size and shape. In the illustrated example, each of the flakes 57 is rectangular in shape, however other shapes are possible. In one embodiment, the fibers 59 may be considered in the art as being "long fibers". As used herein the term "long fibers" refers to fibers having a length L generally greater than 0.25 inches. In one embodiment, without limitation, the fibers 69 have a length L of between approximately 0.25 inches and approximately 0.50 inches. It may also be possible to employ flakes 57 of a thermoplastic resin reinforced with bidirectional fibers (not shown).

The compression cylinder 50 includes an internal piston 52 driven by a ram 54 coupled with a suitable power source (not shown) such as a hydraulic cylinder. The charge 56 is heated to the melting temperature of the thermoplastic resin in the flakes 57, resulting in a flowable mixture of thermoplastic resin and randomly oriented but discontinuous, long fibers 59. Downward displacement 58 of the piston 52 by the ram 54 compresses the flowable mixture, forcing the latter through the inlet openings 68, into the upper and lower mold cavities 64 to compression mold the part 30 along with the fittings 40, substantially simultaneously.

In use, a charge 56 of the thermoplastic prepreg flakes 57 is placed in a compression cylinder 50. One or more optional inserts 46 may be placed in the lower mold cavity 64, and the lower and upper molds 60, respectively, are closed and fastened together in preparation for a compression molding operation. The charge 56 is heated using any suitable means to form a flowable mixture of the thermoplastic resin and the long fibers 59. The piston 52 within the compression cylinder 50 forces the flowable mixture through the inlet openings 68, into the mold cavities 64, 65, simultaneously forming a portion of the part 30 along with one or more fittings 40.

Figure 7:
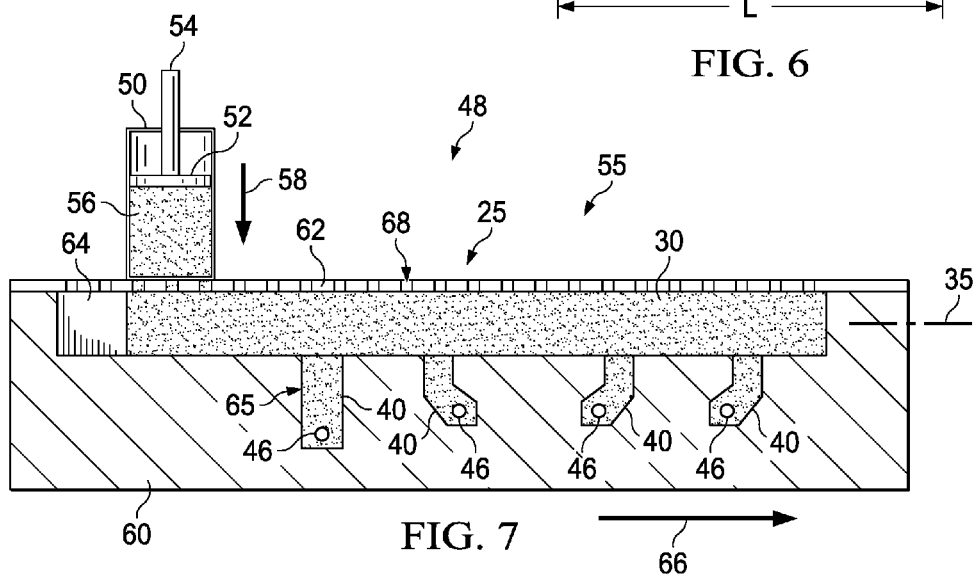
FIG. 7 is an illustration similar to FIG. 4 but showing the compression cylinder having advanced to form additional regions on the support structure.

The simultaneous molding of the part 30 along with the fittings 40 results in integrated composite support structure 25 in which the fittings 40 are integral with the part 30. As the charge 56 is being compressed into the mold cavities 64, 65 the mold assembly 48 (and/or the compression cylinder 50) is moved 66. The relative movement between the mold assembly 48 and the compression cylinder 50 may be substantially continuous or incremental as the melted charge 56 flows through the inlet openings 68 and is compressed into the mold cavities 64, 65. Depending on the length of the part composite support structure 25, additional charges 56 may be introduced into the compression cylinder 50 in order to form the complete part 30 in a substantially continuous, but sequentially performed compression molding operation. FIG. 7 shows the compression cylinder 50 having advanced and the part 30 nearly completed along with four integral fittings 40.

Figure 4:
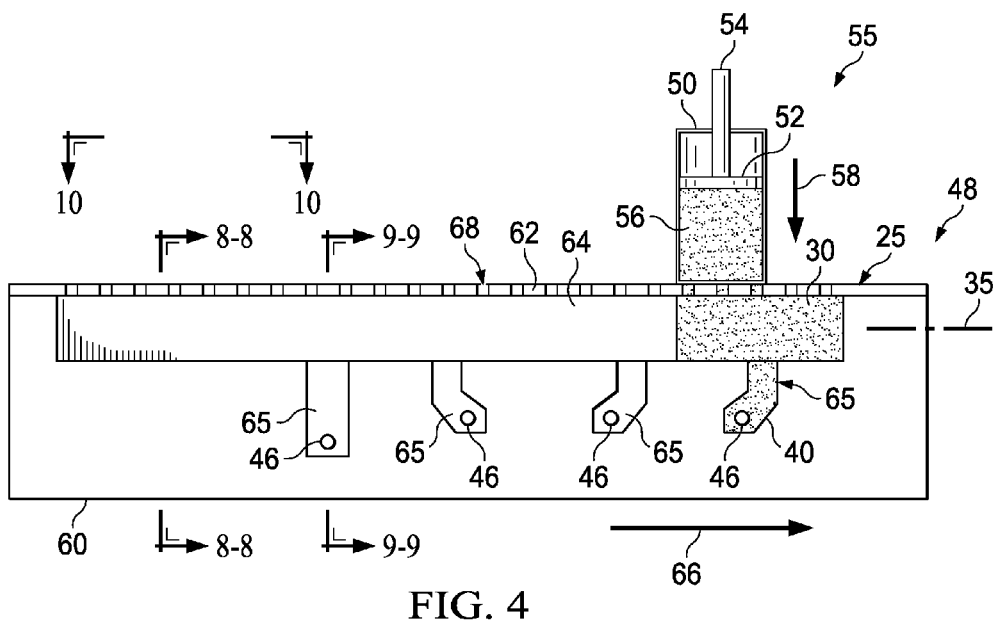
FIG. 4 is illustration of a longitudinal sectional view illustrating apparatus for forming the support structure shown in FIGS. 1-3, the support structure having been partially formed by a compression cylinder.
Figure 12:
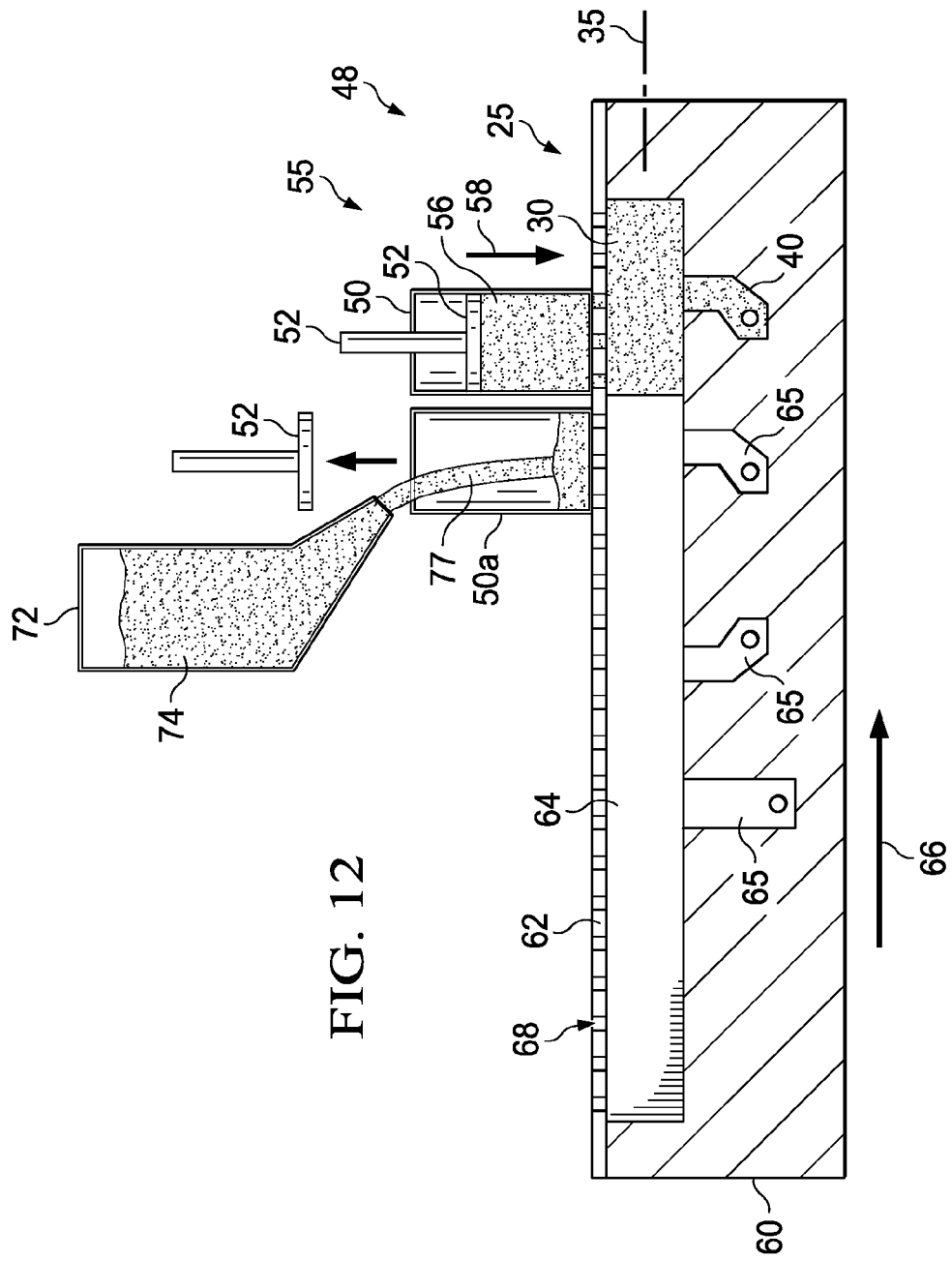
FIG. 12 is an illustration similar to FIG. 4 but showing a second compression cylinder being filled with prepreg flakes as the first compression cylinder is molding a region on the part.

FIG. 12 illustrates an alternate embodiment of the apparatus 55 which is similar to the apparatus shown in FIGS. 4 and 7, except that one or more additional compression cylinders 50a are located side-by-side ahead of the compression cylinder 50 that is the process of compression molding the structure 25, including the fittings 40. By placing additional compression cylinders 50a on the mold assembly 48 at advanced positions (toward the left as viewed in FIG. 12), the compression cylinders 50a may be filled 77 with a charge 56 of the flakes 57 from a supply 74 of the flakes 74 held in a reservoir 72. When the charge 56 in compression cylinder 50 has been transferred and compression molded into the mold assembly 48, the piston may be transferred to the next-in-line compression cylinder 50a after the latter has been filled with a charge 56. The next-in-line compression cylinder 50a is then used to continue the sequential compression molding process, compression molding the next section of the part 30 and the fittings 40, as the mold assembly 48 continues to move relative to the compression cylinders 50, 50a.

Figure 13:
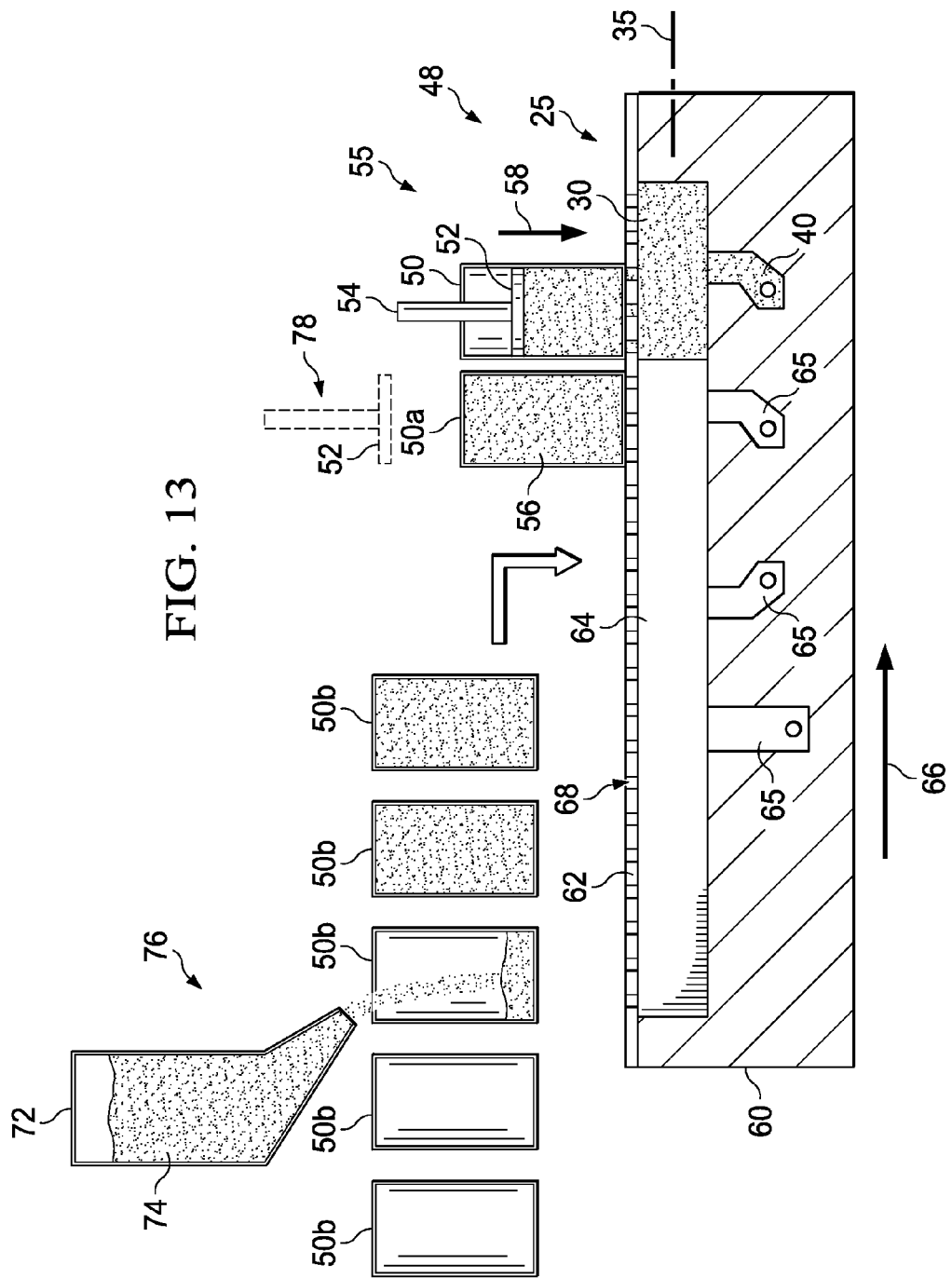
FIG. 13 is an illustration similar to FIG. 12, but showing a series of compression cylinders being filled with prepreg flakes off-line to increase production rates.
Figure 14:
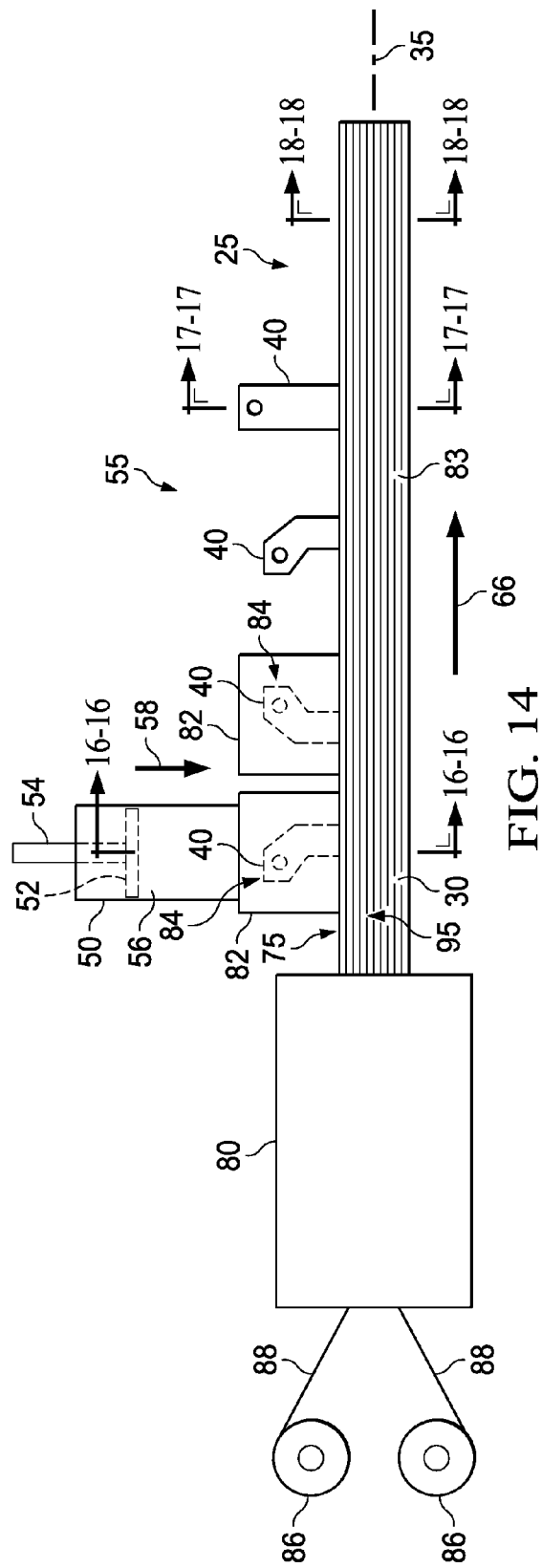
FIG. 14 is an illustration of a side view alternate form of the apparatus for making a thermoplastic composite support structure having integral fittings.

Referring to FIG. 13, it may be possible to increase the speed of the compression molding process by using a plurality of the compression molding cylinders 50, 50a, 50b, a reservoir 72 of the flakes 74 to fill compression cylinders 50b off-line 76. The compression cylinders 50b are filled off-line 76, simultaneously as compression molding is being carried out using compression cylinders 50, 50a that have been previously placed on the mold assembly 48. As the compression cylinders 50b are filled, and compression molding operations are completed using compression cylinders 50, 50a, compression cylinders 50b that have been pre-filled off-line 76 are transferred onto the mold assembly 48, and compression cylinders 50, 50a that have been depleted are transferred from the mold assembly 48 off-line 76 for refilling.

Attention is now directed to FIGS. 14-18 which illustrate another embodiment of the apparatus 55 for making a thermoplastic composite structure 25 comprising a thermoplastic composite part 30 having one or more integral, thermoplastic composite fittings 40. In contrast to previously described embodiments, in this example, the part 30 is reinforced by continuous, unidirectional fibers 83, while each of the fittings 40 is reinforced by discontinuous, generally randomly oriented fibers 59 (FIG. 6). The reinforcing fibers 59, 83 may comprise, without limitation glass fibers, carbon fibers or fibers formed from other materials suitable for the application. The thermoplastic resin in the part 30 and the fittings 40 may include thermoplastic matrix polymers as, without limitation, polyetheretherketone ("PEEK"), polyetherketoneketone ("PEKK"), polyphenylsulfone ("PPS"), polyetherimide ("PEI").

The thermoplastic composite part 30 may be produced by a continuous compression molding (CCM) machine 80 that will be discussed later in more detail. In the illustrated example, the thermoplastic resin part 30 is reinforced with continuous unidirectional fibers 83 formed of a material such as, without limitation, carbon or glass that is suitable for the application. In other embodiments, the fiber reinforcement may be bidirectional. The fittings 40 are formed from a thermoplastic resin reinforced with randomly oriented fibers 59 (FIG. 6), similar to the fittings 40 previously discussed in connection with FIGS. 1-7. The fittings 40 are integrally joined to the part 30 by a melting or welding process that will be described later.

Figure 15:
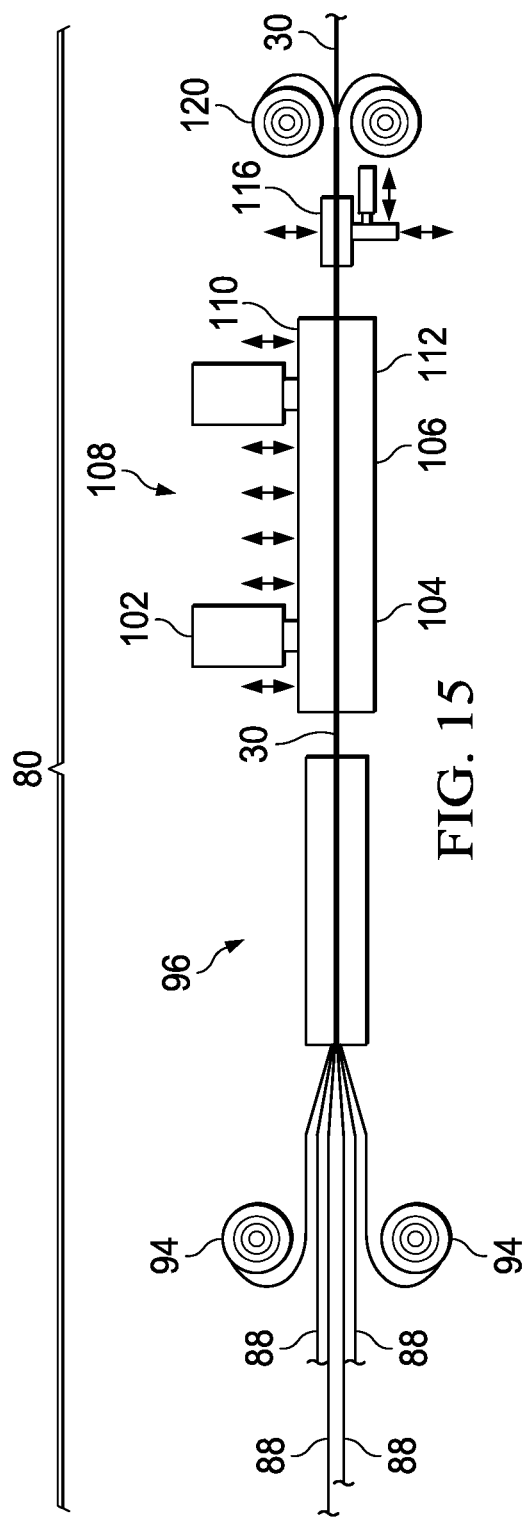
FIG. 15 is an illustration of a diagrammatic side view showing additional details of the continuous compression molding machine shown in FIG. 14.

FIG. 15 illustrates additional details of one suitable embodiment of the CCM machine 80. The CCM machine 80 broadly comprises a pre-forming zone 96 and a consolidation zone 108. In the pre-forming zone 96, plies 88 of fiber reinforced thermoplastic material are loaded in their proper orientations into a ply stack, and combined with tooling 94. The stack of plies 88 are fed, along with the tooling 94, into the pre-forming zone 96 where they are preformed to the general shape of the part at an elevated temperature. The pre-formed part 30 then exits the pre-forming zone 96 and enters the consolidation zone 108, where it is consolidated to form a single, integrated thermoplastic composite laminate part 30. The elevated temperature used in pre-forming the part 30 is sufficiently high to cause softening of the plies 88 so that the plies 88 may be bent, if desired, during the pre-forming process.

The preformed part 30 enters a separate or connected consolidating structure 102 within the consolidation zone 108. The consolidating structure 102 includes a plurality of standardized tooling dies generally indicated at 110 that are individually mated with the tooling 94. The consolidating structure 102 has a pulsating structure 116 that incrementally moves the preformed part 30 forward within the consolidation zone 108 and away from the pre-forming zone 96. As the part 30 moves forward, the part 30 first enters a heating zone 104 that heats the part to a temperature which allows the free flow of the polymeric component of the matrix resin of the plies 88.

Next, the part 30 moves forward to a pressing zone 106, wherein standardized dies 110 are brought down collectively or individually at a predefined force (pressure) sufficient to consolidate (i.e. allow free flow of the matrix resin) the plies 88 into its desired shape and thickness. Each die 110 may be formed having a plurality of different temperature zones with insulators. The dies 110 are opened, and the part 30 is advanced within the consolidating structure 102 away from the pre-forming zone 96. The dies 110 are then closed again, allowing a portion of the preformed part 30 to be compressed under force within a different temperature zone. The process is repeated for each temperature zone of the die 110 as the preformed part 30 is incrementally advanced towards a cooling zone 112.

In the cooling zone 112, the temperature of the formed and shaped part 30 may be brought below the free flowing temperature of the matrix resin of the plies 88, thereby causing the fused or consolidated part 30 to harden to its ultimate pressed shape. The fully formed and consolidated part 30 then exits the consolidating structure 102, where the tooling members 94 may be collected at 120.

Further details of the CCM machine 80 and related continuous compression molding process are described in German Patent Application Publication No. 4017978, published on Sep. 30, 1993, and incorporated herein by reference. However, other molding processes known to those of ordinary skill in the art are specifically contemplated by the disclosure, including but not limited to pultrusion or roll forming.

Depending upon the construction of the CCM machine 80, it may be necessary to reheat the part 30 to, or near its melting temperature after it exits the CCM machine 80 in preparation for integral joining with the fittings 40. In one embodiment, after the part 30 has been consolidated, it may not be cooled in the cooling zone 112, in which case it may exit the CCM machine 80 at or near its melting temperature. In another embodiment however, heat 75 (FIG. 14) may be applied to the part 30 after it exits the CCM machine 80 in order to reheat the part 30 to its melting temperature after it has been cooled in the cooling zone 112.

Figure 16:
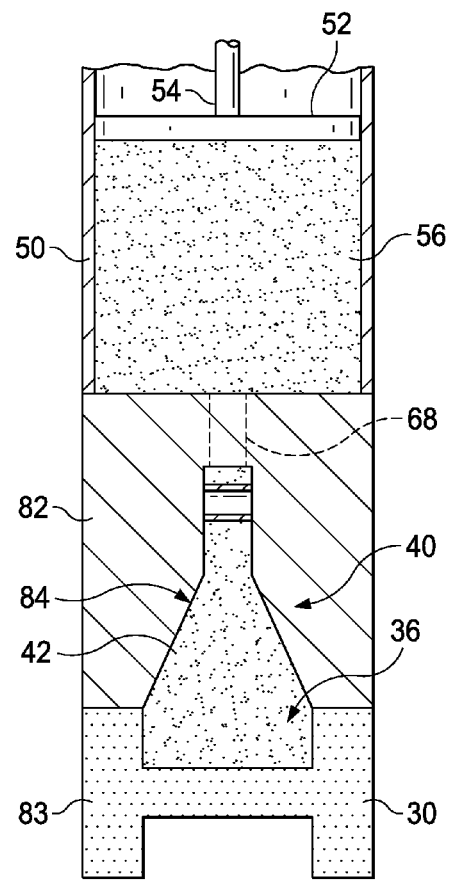
FIG. 16 is illustration of a sectional view taken along the line 16-16 in FIG. 14.
Figure 17:
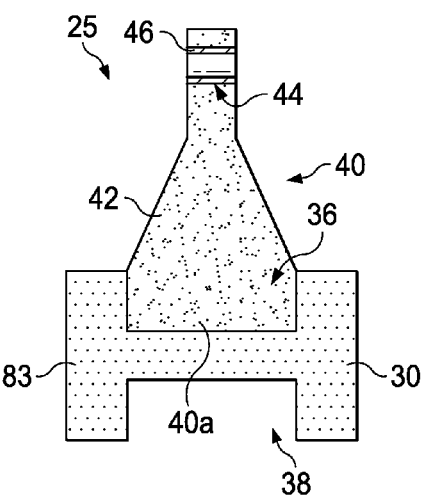
FIG. 17 is illustration of a sectional view taken along the line 17-17 in FIG. 14.
Figure 18:
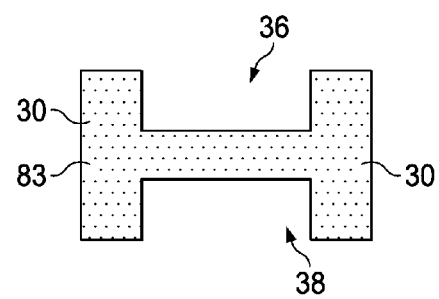
FIG. 18 is an illustration of a sectional view taken along the line 18-18 in FIG. 14.

Referring to FIGS. 14 and 16-18, as the part exits the CCM machine 80, one or more compression molds 82 are placed on top of the part 30 in desired regions 95 of the part 30 where the fittings 40 are to be formed. The part regions 95 are heated, as required, to the melting temperature or near the melting temperature of the thermoplastic resin of the part 30. The compression molds 82 have internal mold cavities 84 that substantially correspond to the shape of the fittings 40. The bottom of each of the compression molds 82 is open and compliments features of the just-formed part 30, which in the illustrated example, comprises the upper channel 36 (FIG. 16). Although not shown in the drawings, each of the molds 82 may have integrated heating and cooling to control the temperature of the mold 82.

A compression cylinder 50 containing a charge of fiber reinforced, thermoplastic flakes, is placed on top of the mold 82. The thermoplastic resin in the charge 56 is heated to its melting temperature, resulting in a mixture of flowable thermoplastic resin and reinforcing fibers. The ram 54 displaces the piston 52 downward 58 to press the melted charge 56 through inlet openings 68 into the mold 82, thereby compression molding the fittings 40. As best seen in Figures and 16 and 17, the melted charge 56 flows into and fills the upper channel 36 of the part 30 at the location where the fittings 40 is to be formed. During this compression molding process, the melted thermoplastic resin of the charge 56 melts together with the softened or melted thermoplastic resin in the part 30, resulting in an integral joining or welding of the fitting 40 with the part 30.

Figure 19:
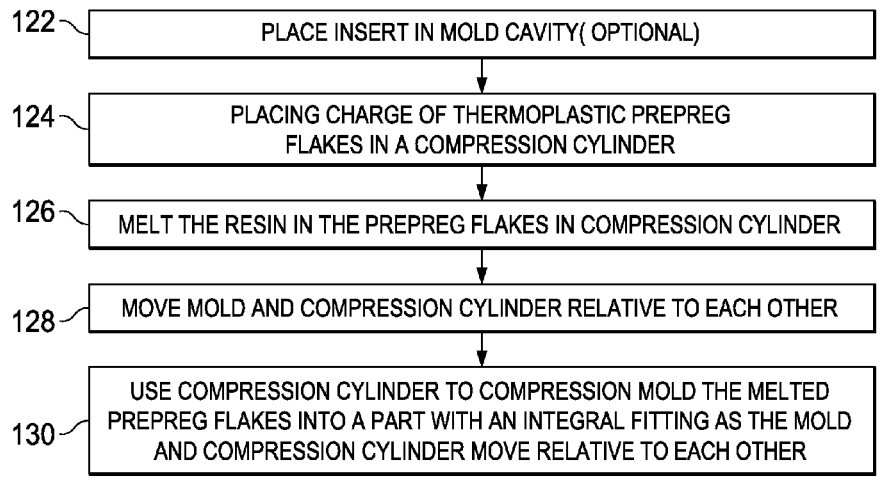
FIG. 19 is an illustration of a flow diagram of a method of making a thermoplastic composite support structure having an integral fitting.

Attention is now directed to FIG. 19 which broadly illustrates the steps of a method of forming a fiber reinforced thermoplastic part 30 having integral fittings 40. At step 122, optional inserts 46 may be placed in a mold cavity 65 within a mold assembly 48, and at 124, a charge 56 of thermoplastic prepreg flakes 57 is placed in a compression cylinder 50. At 126, the resin in the thermoplastic prepreg flakes 57 is melted within the compression cylinder 50. At 128, the mold assembly 48 and the compression cylinder 50 are moved relative to each other. At 130, the compression cylinder 50 is used to compression mold the melted prepreg flakes 57 into a part 30 having an integral fittings 40 as the mold assembly 48 and the compression cylinder 50 move relative to each other.

Figure 20:
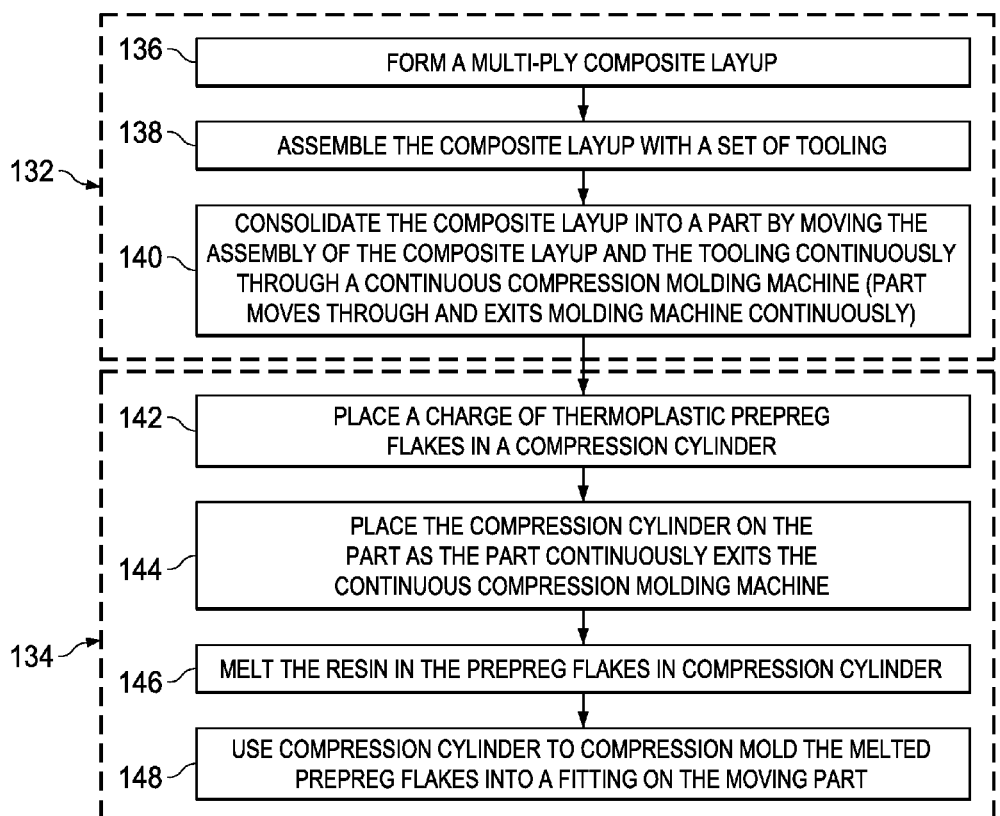
FIG. 20 is an illustration of a flow diagram of an alternate method of making a thermoplastic composite support structure having integral fittings.

FIG. 20 illustrates an alternate embodiment for forming a fiber reinforced, thermoplastic support structure 25 comprising a fiber reinforced, thermoplastic part 30 having integral fiber reinforced, thermoplastic fittings 40. Broadly, a thermoplastic part 30 reinforced with continuous fibers is produced at 132, and at 134, fittings 40 are compression molded onto the part 30. Production of the thermoplastic part 30 begins with step 136 in which a multiply thermoplastic composite layup is formed, as by tacking a series of plies 88 together. At 138, a thermoplastic composite layup is assembled with a set of tooling 94 adapted to form various features of the part 30. At step 140, the thermoplastic composite layup is consolidated into a part 30 by moving the assembly of the layup and the tooling continuously through a continuous compression molding machine 80. Alternatively, the assembly of the layup and the tooling can be moved through the continuous molding machine in a pulse-like or step-wise manner. The part 30 exits the continuous compression molding machine 80 substantially continuously.

Production of the fitting 40 begins at step 142 in which a charge 56 of thermoplastic prepreg flakes 57 is introduced into a compression cylinder 50. At step 144, the compression cylinder 50, along with appropriate tooling such as molds 82, are placed on the part 30 as the part 30 exits the continuous compression molding machine 80, either continuously or in a step-wise manner. At step 146, the prepreg flakes 57 are heated to melt the resin in the prepreg flakes 57. At 148, the compression cylinder 50 is used to compression mold the melted prepreg flakes into a fitting 40 on the moving part 30, such that the fitting 40 is integrally joined with the part 30. The compression molding performed by the compression cylinder 50 is coordinated or synchronized with the movement of the part 30 through the continuous molding machine 80. Furthermore, in the case of the embodiment shown in FIG. 14, molds 82 or other tooling used to compression mold the fittings 40 are placed on the part 30 as the part 30 exits the continuous molding machine 80.

Embodiments of the disclosure may find use in a variety of potential applications, particularly in the transportation industry, including for example, aerospace, marine, automotive applications and other application where elongated composite parts having fittings may be used. Thus, referring now to FIGS. 21 and 22, embodiments of the disclosure may be used in the context of an aircraft manufacturing and service method 150 as shown in FIG. 21 and an aircraft 152 as shown in FIG. 22. Aircraft applications of the disclosed embodiments may include, for example, without limitation, elongated composite parts such as hangers and supports having fittings to which components may be attached.

During pre-production, exemplary method 150 may include specification and design 154 of the aircraft 152 and material procurement 156. During production, component and subassembly manufacturing 158 and system integration 160 of the aircraft 152 takes place. The disclosed method 150 may be employed to produce light weight parts for mounting or supporting components and subassemblies produced in step 158 and integrated in step 160. Thereafter, the aircraft 152 goes through certification and delivery 162 in order to be placed in service 164. While in service by a customer, the aircraft 152 is scheduled for routine maintenance and service 166, which may also include modification, reconfiguration, refurbishment, and so on. During maintenance and service 166, the disclosed light weight composite parts having integral fitting may be used to replace existing parts, and/or to mount additional components on the aircraft 152.

Each of the processes of method 150 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 22, the aircraft 152 produced by exemplary method 150 may include an airframe 168 with a plurality of systems 170 and an interior 172. Within the interior 172, the disclosed method 150 may be employed to produce a part such as a hanger 174 having fittings 176 adapted to support, mount or stabilize one or more components 178 such as, for example and without notation, an overhead air duct. It may also be possible to employ the disclosed method to produce parts used in the airframe 168. Examples of high-level systems 170 include one or more of a propulsion system 180, an electrical system 182, a hydraulic system 184 and an environmental system 186. Any number of other systems may be included. Although an aerospace example is shown, the principles of the disclosure may be applied to other industries, such as the marine and automotive industries.

Systems and methods embodied herein may be employed during any one or more of the stages of the production and service method 150. For example, components or subassemblies corresponding to production process 158 may be fabricated or manufactured in a manner similar to components or subassemblies produced while the aircraft 152 is in service. Also, one or more apparatus embodiments, method embodiments, or a combination thereof may be utilized during the production stages 158 and 160, for example, by substantially expediting assembly of or reducing the cost of an aircraft 120. Similarly, one or more of apparatus embodiments, method embodiments, or a combination thereof may be utilized while the aircraft 120 is in service, for example and without limitation, to maintenance and service 166.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of making a composite part having at least one integral fitting, comprising:
   placing a compression cylinder on a mold having a part cavity and at least one fitting cavity;
   relatively moving the compression cylinder and the mold along a length of the part;
   placing a charge of fiber reinforced resin flakes in the cylinder;
   melting resin in the flakes to form a flowable mixture of resin and fibers; and
   compressing the flowable mixture into the part cavity and into the fitting cavity as the compression cylinder and the mold move relative to each other along the length of the part.

2. The method of claim 1, wherein relatively moving the compression cylinder and the mold is performed by continuously moving the mold relative to the compression cylinder.

3. The method of claim 1, wherein relatively moving the compression cylinder and the mold is performed by intermittently moving the mold relative to the compression cylinder.

4. The method of claim 1, further comprising:
   placing a charge of fiber reinforced resin flakes in each of a plurality of compression cylinders; and
   placing each of the compression cylinders on the mold at different locations to respectively form different regions of the part.

5. The method of claim 1, wherein compressing the flowable mixture is performed by forcing a piston through the cylinder.

6. The method of claim 1, wherein the resin is a thermoplastic resin.

7. The method of claim 1, wherein each of the fibers has a length greater than approximately 0.25 inches.

8. The method of claim 1, wherein each of the fibers has a length of approximately 0.5 inches.

9. A method of making an elongated, fiber reinforced thermoplastic structure having an integral fitting, comprising:
   forming a fiber reinforced thermoplastic part by continuous compression molding;
   placing a compression cylinder on the part;

compression molding a thermoplastic fitting on the fiber reinforced thermoplastic part using the compression cylinder to compress a flowable mixture of thermoplastic resin and randomly oriented reinforcing fibers onto the part; and moving the part relative to the compression cylinder along a length of the part to various regions along the length of the part to successively form each of a plurality of fittings on the part.

10. The method of claim 9, further comprising:
melting together areas of the part with the flowable resin.

11. The method of claim 9, wherein compression molding a thermoplastic fitting includes:
positioning each of a plurality of molds on the part, and
using the compression cylinder to compress a flowable mixture of thermoplastic resin and fibers into each of the molds and against the part.

12. The method of claim 11, further comprising:
introducing a charge of thermoplastic prepreg flakes into the compression cylinder; and
melting the resin in the prepreg flakes by heating the charge within the compression cylinder.

\* \* \* \* \*